United States Patent [19]

Unuvar et al.

[11] Patent Number: 5,307,776

[45] Date of Patent: May 3, 1994

[54] RECOGNITION ALGORITHM FOR ELECTRONIC THROTTLE CONTROL

[75] Inventors: Lisa M. Unuvar, Flint; Daniel A. Crawford, Burton, both of Mich.

[73] Assignee: General Motors Corporation, Detroit, Mich.

[21] Appl. No.: 43,046

[22] Filed: Apr. 5, 1993

[51] Int. Cl.⁵ .............................................. F02D 11/10
[52] U.S. Cl. ................................................... 123/399
[58] Field of Search ............................... 123/361, 399

[56] References Cited

U.S. PATENT DOCUMENTS

| | | | |
|---|---|---|---|
| 4,640,248 | 2/1987 | Stoltman | 123/399 |
| 4,711,218 | 12/1987 | Kabasin | 123/492 |
| 4,869,220 | 9/1989 | Imoehl | 123/399 |
| 4,962,835 | 10/1990 | Prüss | 192/0.03 |
| 4,987,872 | 1/1991 | Geselle et al. | 123/399 X |
| 4,993,384 | 2/1991 | Wiggins et al. | 123/399 |
| 5,115,396 | 5/1992 | Keegan | 123/399 X |
| 5,161,505 | 11/1992 | Bederna et al. | 123/399 |
| 5,167,212 | 12/1992 | Peter et al. | 123/399 |

Primary Examiner—Willis R. Wolfe
Attorney, Agent, or Firm—Howard N. Conkey

[57] ABSTRACT

A recognition algorithm in automotive vehicles having electronic throttle control interprets a combination of operator commands including braking and acceleration commands and imposes a restriction on vehicle motion until a predetermined combination of operator commands are detected.

6 Claims, 4 Drawing Sheets

RECOGNITION ALGORITHM FOR ELECTRONIC THROTTLE CONTROL

FIELD OF THE INVENTION

This invention relates to electronic throttle control and, more specifically, to throttle and brake input recognition in an automotive electronic throttle control system.

BACKGROUND OF THE INVENTION

The application of electronic control to internal combustion engine intake air metering is generally known in the art of engine control. Typically, such control includes a controlled actuator connected to a throttle valve, such as a conventional butterfly valve, wherein valve position is adjusted by controlled actuator motion to provide appropriate restriction on air passage into the engine. The actuator is in communication with a controller which controls actuator motion when air is to be metered to the engine. The controller may be responsive to any one of several ingredients used to formulate the current desired throttle position. For example, such ingredients may include inputs indicative of the engine operating condition, an operator command from an accelerator pedal, or information from an active cruise control algorithm, an active idle speed control algorithm, or an active traction control algorithm. Further, feedback may be provided to the controller, such as from a conventional throttle valve position sensor communicating a signal to the controller the magnitude of which is related to the degree of opening of the throttle valve. Corrective positioning of the actuator or diagnostics may be carried out by the controller in response to the sensor feedback signal.

The advantages of electronic control of intake air metering are well known. For example, an important advantage is that the electronic control may replace the traditional, substantially inflexible cable assembly connecting the vehicle accelerator pedal or its equivalent and the throttle valve. The electronics provide opportunities in vehicle control and diagnostics that were unavailable traditionally. A control opportunity resides in determining and acting on operator intent, which may not be most accurately reflected in traditional driver inputs.

SUMMARY OF THE INVENTION

The present invention addresses a control opportunity that arises with the application of electronic control of intake air metering by providing a vehicle operator a precise means of indicating vehicle motion intentions and by substantially restricting vehicle motion until such intentions are indicated.

According to the invention, a predetermined combination of brake request inputs and acceleration request inputs from the vehicle operator must be received to make out an operator intent for significant vehicle motion. Specifically, for a conventional vehicle with a throttle valve and an accelerator pedal, a first predetermined relationship between accelerator pedal position and throttle valve position is provided until such time as a second predetermined relationship between the two is determined to be appropriate. The second relationship will be assumed to be appropriate when a significant depression of the brake pedal is sensed while the accelerator pedal is fully released.

BRIEF DESCRIPTION OF THE DRAWINGS

The invention may be best understood by reference to the following description of a preferred embodiment and to the drawings in which.

DESCRIPTION OF THE PREFERRED EMBODIMENT

Figure 1:
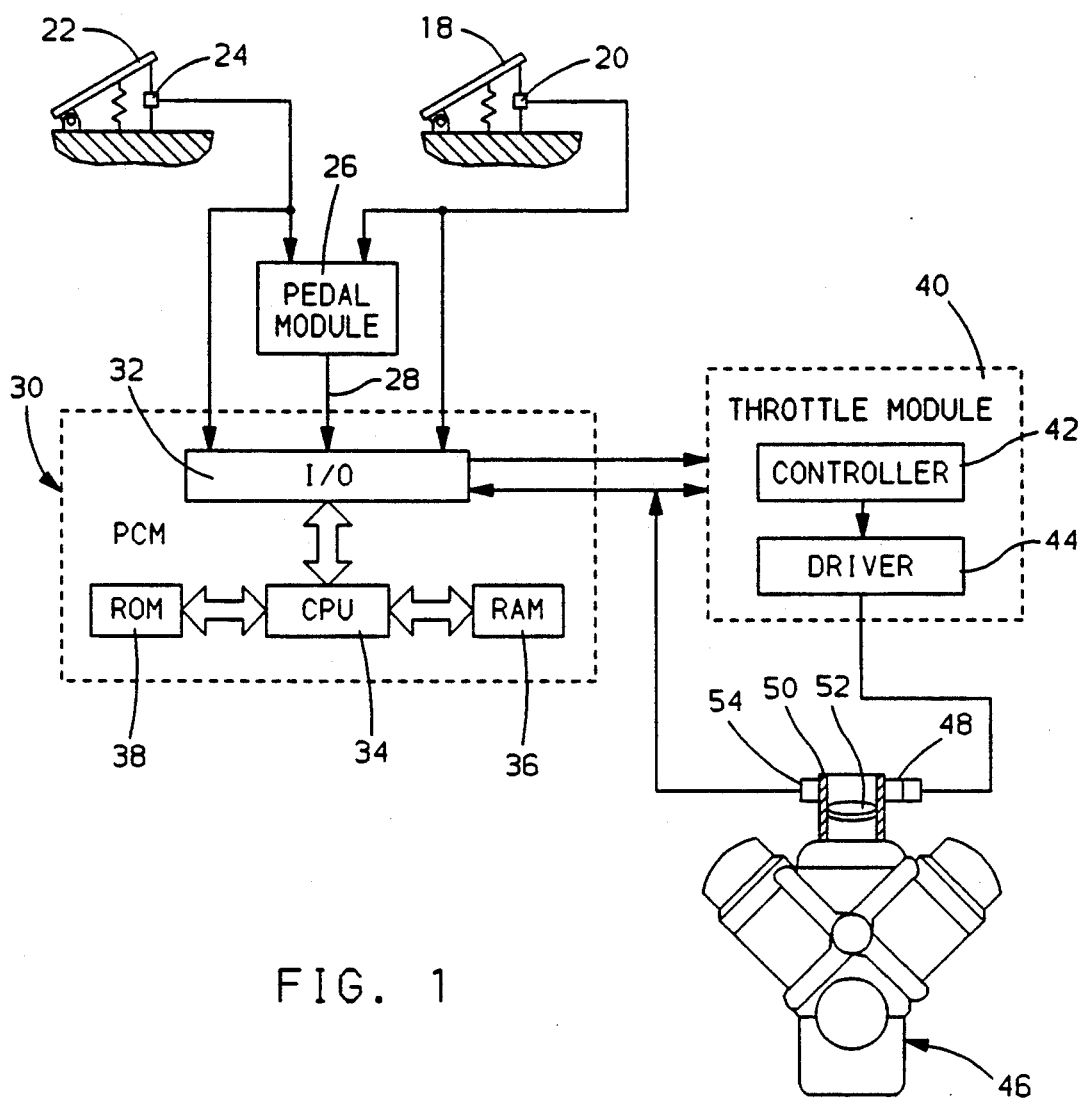
FIG. 1 is a general diagram of hardware components used to carry out this invention in accord with a preferred embodiment.

Referring to FIG. 1, the position of a vehicle brake pedal 22 is sensed by conventional pedal position sensor 24, which may include one or more redundant sensors communicating one or more signals the magnitude of which is proportional to displacement of the pedal 22 away from a rest position. The signals are communicated to pedal module 26 which may consist of a conventional single chip microcontroller that receives the signals and resolves therefrom a value corresponding to the brake pedal displacement away from the rest position.

In an alternative embodiment of this invention, the position sensor 24 may be a simple switch or combination of redundant switches that communicate a high signal to pedal module 26 in the event the pedal 22 is significantly depressed away from its rest position, and otherwise communicate a low signal to the module 26.

A conventional pedal position sensor 20 or multiple conventional position sensors in a redundant configuration sense a degree of depression of vehicle accelerator pedal 18 away from a rest position and communicate a signal the magnitude of which is proportional to the depression to pedal module 26. Pedal module 26 processes the signal or signals and produces therefrom a value representative of the accelerator pedal position.

While the vehicle is operating, pedal module 26 periodically communicates accelerator pedal position and brake pedal position information to a powertrain control module PCM 30, via communication link 28, which may be a serial or parallel link. As illustrated in FIG. 1, raw pedal position signals from position sensors 20 and 24 may be communicated as diagnostic information directly to the PCM 30.

PCM 30 receives information, such as information from link 28 or diagnostic information via an input/output unit I/O 32. The PCM may consist of random access memory storage RAM 36, read only memory storage ROM 38, and a central processing unit CPU 34. Alternatively, the inventors intend that any conventional controller capable of providing generally known powertrain control functions, such as engine and transmission control and diagnostic functions, and emissions control and diagnostic functions may be used as the mechanization of the PCM 30.

A throttle module 40 is provided including a controller 42 and an actuator driver 44. An internal combustion engine 46 having an air intake bore 50 through which intake air flows as is needed in engine operation, includes a throttle valve 52, such as a conventional butterfly valve disposed in the bore 50 for regulating the quantity of air ingested in the engine. An actuator 48, such as a conventional DC motor or other conventional rotary actuator is associated with the throttle valve, such as through a geartrain, in such a manner that rotation of the actuator 48 varies the valve 52 position so as to change the degree of opening of the valve, affecting the capacity of the bore to pass air to the engine, as is well-established in engine control.

The position of the valve 52, such as the rotary position of a conventional butterfly valve, is sensed by a conventional throttle position sensor 54, which communicates a transduced throttle position signal to throttle module 40. The signal may also be communicated to PCM 30, such as for diagnostic or control functions carried out in the PCM.

The controller 42 of throttle module 40 may use throttle position information provided from throttle position sensor 54 to determine any change in position that may be needed to drive the actual throttle valve position to the desired throttle position as provided by PCM 30. Any change in position is translated into a required amount of actuator motion as is generally known in the art, and an appropriate motion command is provided to driver 44 which drives actuator 48 accordingly. The inventors intend that any conventional actuator 48 and driver 44 combination may be used to carry out the principles of this invention.

The specific steps used to carry out the principles of this invention in accord with a preferred and a second embodiment and in the context of the preferred block diagram of FIG. 1 are illustrated in FIGS. 2 through 5, and are entered at step 60 when power is applied to the system, such as when the vehicle operator rotates the vehicle ignition (not shown) to its "on" position. These routines are stored in a well-known manner in system non-volatile memory, such as ROM 38 (FIG. 1) of the PCM 30, and are executed in a step-by-step manner by the CPU 34 of the PCM 30 in accord with general practice in software execution. The inventors intend that these routines may alternatively be stored in non-volatile memory of the pedal module 26 ( FIG. 1) and executed by a single chip microcontroller therein. Furthermore, any means of carrying out the steps illustrated in FIGS. 2-5 is suitable as an embodiment of the principles of this invention as contemplated by the inventors.

Figure 2:
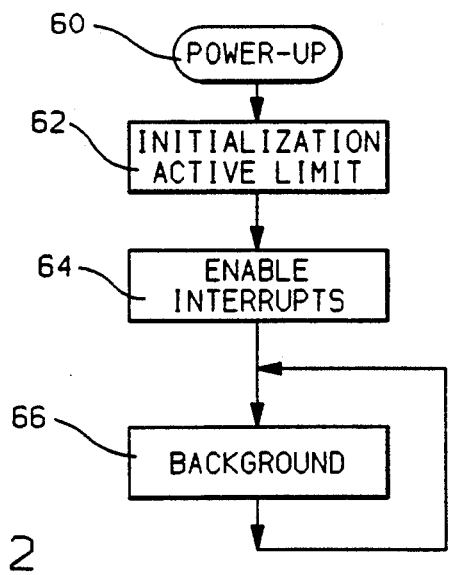
FIGS. 2-5 are computer flow diagrams illustrating the steps used to carry out this invention in accord with the preferred and a second embodiment.

Specifically, when power is applied to the vehicle, the PCM executes the routine of FIG. 2, starting at step 60, and then advances to step 62 to carry out any initialization that may be necessary in accord with customary startup procedures, such as the setting of initial values for pointers, counters, and flags. In accord with this embodiment, a limit flag is activated at step 62, for use in subsequent routines, to be described.

Next, the routine moves to step 64, to enable any conventional interrupts as may be needed by the PCM 30 (FIG. 1) to execute conventional powertrain control, such as timer interrupts to read conventional sensors and perform diagnostics, and event based interrupts to issue conventional powertrain control commands. The routine then proceeds to step 66 to execute a background routine that is continuously executed while the PCM 30 is operating. The background routine may include general diagnostic and maintenance routines, and is interrupted upon the occurrence of certain control events, such as one of the above-described interrupts. Upon the occurrence of such interrupts, the CPU 34 will vector control to an appropriate interrupt service routine and, upon completion of the routine, the background routine will resume operation where it left off.

Figure 3:
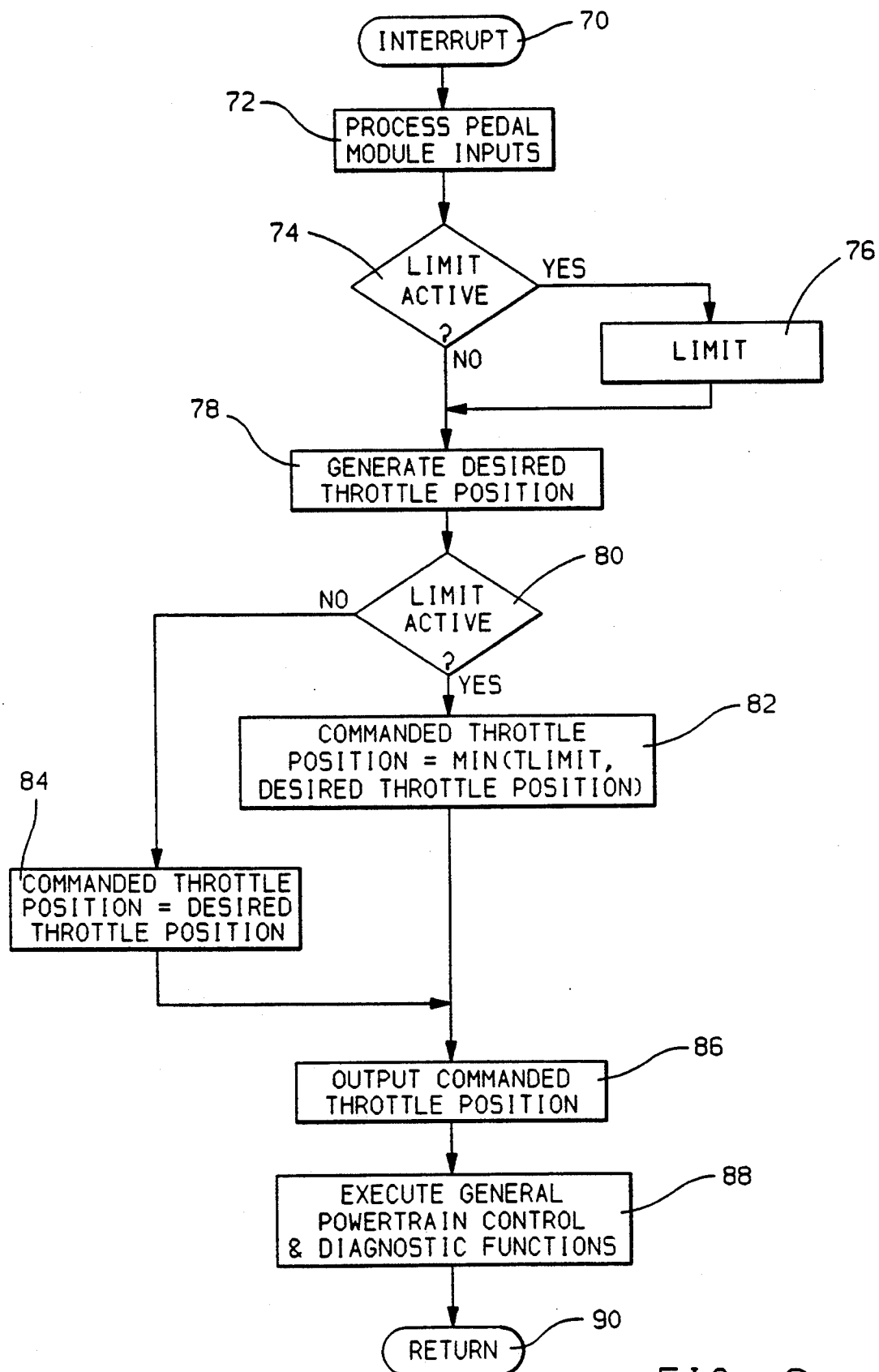

One such interrupt routine is illustrated in FIG. 3, and is entered upon the occurrence of an appropriate interrupt at step 70. The routine then moves to step 72, to process the most recent pedal inputs, such as the inputs from the communication link 28, as described. The processing at step 72 may include interpreting and storing the most recent sensed position of the brake pedal 22, the most recent sensed position of the accelerator pedal 18, and executing diagnostic routines from any redundant information received on the position of either pedal.

After processing the pedal module inputs, the routine advances to step 74, to determine, in accord with this invention, whether a limit on throttle position is active. Such a limit will remain active for a period of time after the vehicle is "turned on" until a predetermined combination of inputs are received by the PCM 30, as will be described.

Figure 4:
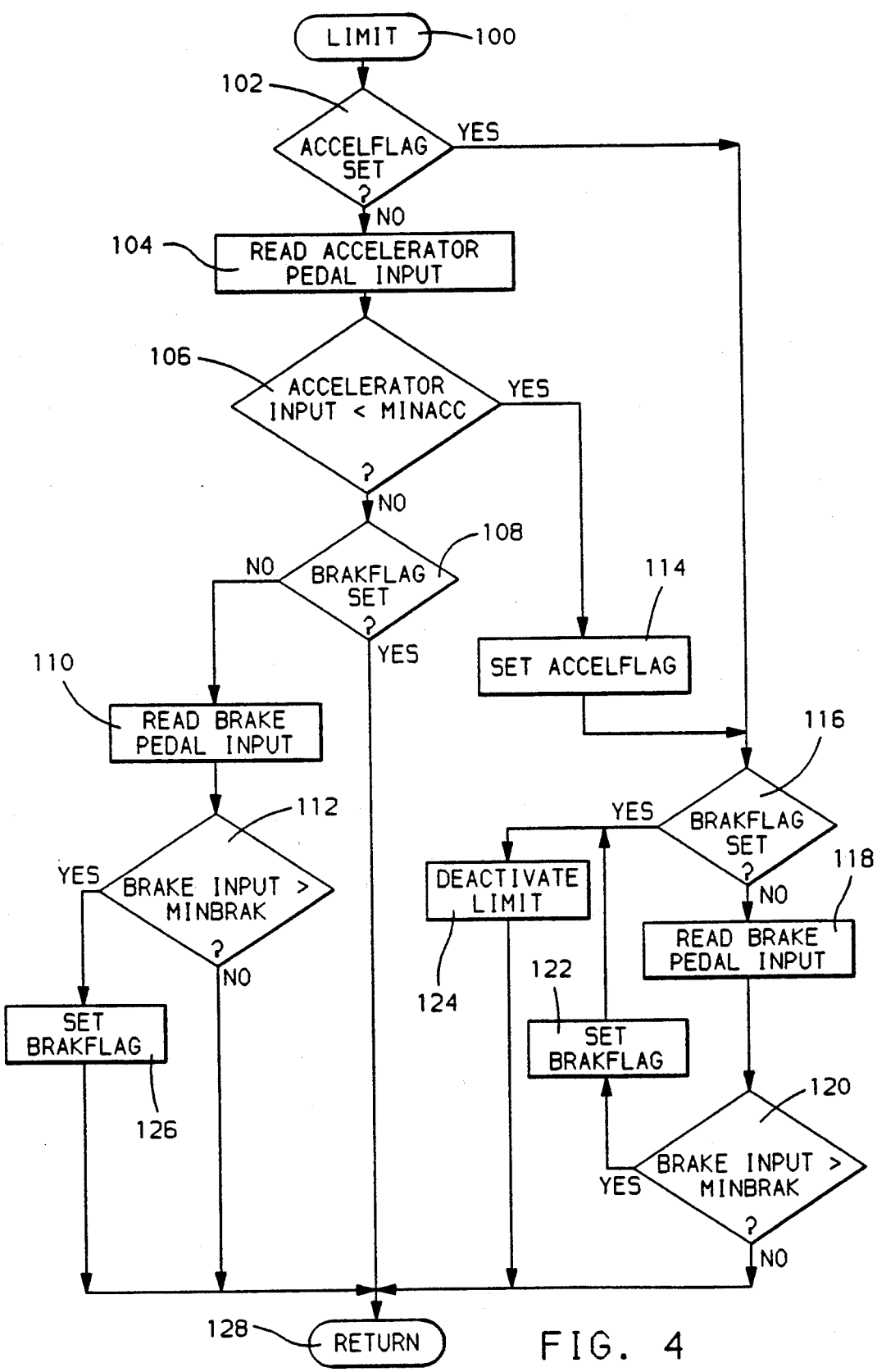

If, at step 74, the limit is active, the routine advances to step 76 to execute a routine LIMIT, illustrated in FIG. 4. The LIMIT routine, as will be described, determines whether the limit should be deactivated. After executing the LIMIT routine at step 76, or if limit was not active at step 74, the routine moves to step 78, to generate a desired throttle position. The desired throttle position is determined in accord with well understood principles of throttle control, as the position of the throttle valve 52 (FIG. 1) that, for the given engine operating condition, will provide a desired restriction on air entering the engine 46. The desired throttle position is determined based on such information as the position of the accelerator pedal 18 (FIG. 1), the present sensed engine speed and load, and commands such as a cruise control command, an idle speed control command, or a traction control command.

After determining the desired throttle valve position, the routine moves to step 80, to determine again if the limit is active. If so, the routine moves to step 82, to subject the desired throttle position to a predetermined limit TLIMIT, which should be set to a value corresponding to a high restriction on air passing the throttle valve 52 (FIG. 1). For example, if the throttle valve 52 is closed at "zero percent throttle" and is wide open at or near "100 percent throttle", then TLIMIT in this embodiment should be set slightly above zero percent throttle, to allow some minimum air passage, sufficient to allow the engine to operate at low engine speeds, but not sufficient to allow operation significantly above a conventional engine idle speed. For example, TLIMIT may be set to allow engine operation up to approximately 1000 r.p.m. The inventors intend that TLIMIT can be set to any value within a range of reasonably low engine speeds. Specifically, at step 82, the commanded throttle position will be set to the lesser of the desired throttle position as determined at step 78, or TLIMIT.

Returning to step 80, if limit is not active, then commanded throttle position, the position that will be ultimately be commanded by the controller, is set to the desired throttle position determined step 78, without the limits imposed by step 82. Next, or after step 82, the routine proceeds to step 86, to communicate the commanded throttle position to the throttle module 40 (FIG. 1). The controller 42 of the throttle module 40 will, in accord with generally understood principles of electronic throttle control, determine any change in throttle position necessary to drive the actual throttle position, which may be an open loop estimation or a closed loop throttle position sensor based value, toward the commanded throttle position in an efficient manner. The position change will be used to determine an actuator drive command which will be issued from driver 44 (FIG. 1) to the actuator 48, as described.

Returning to FIG. 3, after outputting the commanded throttle position at step 86, the routine moves to step 88, to execute any conventional powertrain control or diagnostic functions that may be required at the present interrupt. The routine then proceeds to step 90, to return to the background routine of FIG. 2.

The routine of FIG. 4 is called at step 76 of the routine of FIG. 3, and generally determines whether the limit on throttle position should, in accord with this invention, remain active. Specifically, when called, the routine starts at step 100 and moves to step 102, to determine if a flag ACCELFLAG is set. ACCELFLAG may be stored in RAM 36 (FIG. 1) and is cleared at power-up. This flag remains clear after power is applied to the vehicle until the accelerator pedal 18 is released. If the flag is not set at step 102, the routine moves to steps 104 and 106 to determine if it should be set.

Specifically, the routine first reads the present accelerator pedal input at step 104. The routine then proceeds to step 106, to determine if the accelerator pedal input is less than MINACC, a minimum pedal position which is calibrated to be of a sufficiently small magnitude such that, if the pedal input is smaller in magnitude than MINACC, the accelerator pedal is assumed to not be depressed away from its rest position. MINACC is stored in non-volatile memory, such as ROM 38 (FIG. 1).

Accordingly, at step 106, if the pedal input is less than MINACC, the routine moves to step 114, to set ACCELFLAG, to indicate that the accelerator pedal is substantially released. The routine then moves to step 116, to be described.

Alternatively at step 106, if the pedal input is not less than MINACC, the routine moves to step 108, to check the status of BRAKFLAG, which is a flag stored in RAM 36 (FIG. 1) and cleared at power-up. BRAKFLAG remains clear after power is applied to the vehicle until, in the routine of FIG. 4, a significantly depressed brake pedal is sensed. Returning to step 108, if BRAKFLAG is not set, the routine moves to step 110 and 112 to determine if it should be set.

Specifically, step 110 is first executed, wherein the brake pedal input is read as an indication of the most recent sensed position of the brake pedal. The brake pedal input may provide a simple binary indication of whether any significant depression of the pedal 22 has been sensed, as described.

Alternatively and in this embodiment, the pedal input may provide information on the degree of depression of the pedal 22. After reading the brake pedal input at step 110, the routine moves to step 112, to compare the brake pedal input of this embodiment to a predetermined calibration value MINBRAK, which is stored in non-volatile memory, such as ROM 38 (FIG. 1). MINBRAK is calibrated as the minimum degree of depression of the brake pedal 22 (FIG. 1) that may be interpreted as an operator request for braking. For example, MINBRAK may be set to a value representative of five to ten percent of the range of brake pedal depression.

Returning to step 112, if the brake input is greater than MINBRAK, then the routine proceeds to step 126 to set BRAKFLAG, to indicate that a significant brake pedal input has been received since power-up. Next, or if the brake input did not exceed MINBRAK at step 112, or if BRAKFLAG was already set at step 108, the routine moves to step 128, to return to step 76 of FIG. 3.

Returning to step 102, if ACCELFLAG is set, indicating the accelerator pedal was determined to have been released in a prior iteration of the routine of FIG. 4, the routine passes over further analysis of the accelerator pedal and moves to step 116 to determine whether BRAKFLAG is set. As described, BRAKFLAG indicates whether a significant depression of brake pedal 22 (FIG. 1) has been sensed. If, at step 116, BRAKFLAG is set, the routine moves to step 124 to deactivate the limiting of the desired throttle position. This deactivation will remove TLIMIT as an upper limit on allowed throttle position, and will preclude subsequent execution of the routine of FIG. 4 until power is removed from the vehicle and later reapplied. After deactivating limit at step 124, the routine moves to step 128 to return to the routine of FIG. 3, as described.

Returning to step 116, if BRAKFLAG is not set, the routine moves to step 118 to read the brake pedal input in the manner described at step 110. The routine then proceeds to step 120, to compare the brake input to MINBRAK in the manner described previously at step 112. If the brake input exceeds MINBRAK at step 120, the routine advances to step 122 to set BRAKFLAG indicating a significant brake input has been received. The routine then moves to step 124 to deactivate the limit, as both conditions to deactivation have been met. Next, or if the brake input does not exceed MINBRAK at step 120, the routine moves to step 128, to return to the routine of FIG. 3 from which it was called, as described.

Figure 5:
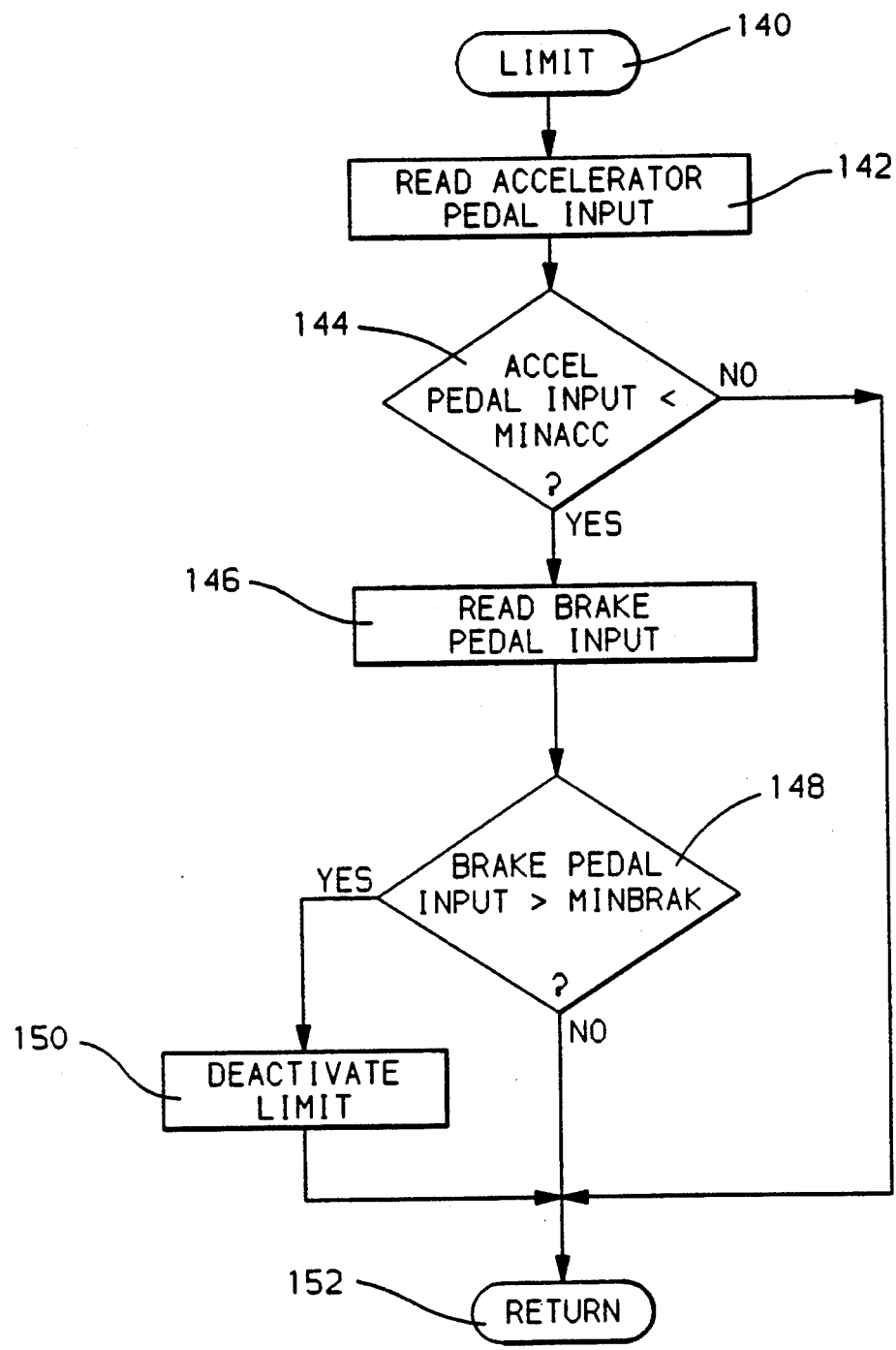

The routine of FIG. 5 illustrates an alternative embodiment of the present invention, and in such alternative embodiment may entirely supplant the routine of FIG. 4. Accordingly, in an alternative embodiment, step 76 of the routine of FIG. 3 would execute the routine of FIG. 5, and after FIG. 5 were executed, control would return to the routine of FIG. 3, as was described in the preceding embodiment. In this alternative embodiment, throttle position restriction is removed when a significant brake pedal depression is sensed while the accelerator pedal is determined to be substantially released.

Specifically in the alternative embodiment, the routine of FIG. 5 is entered at step 140 when called from step 76 of the routine of FIG. 3, and proceeds to step 142 to read the accelerator pedal 18 (FIG. 1) input. This input may be read in the manner described at step 104 of the routine of FIG. 4. The routine next advances to step 144 to compare the accelerator pedal input to MINACC, which is a calibration constant set as described in the preceding embodiment.

If the accelerator pedal input is less than MINACC at step 144, the routine proceeds to steps 146-148 to determined whether the brake pedal 22 (FIG. 1) is significantly depressed. In detail, the routine moves to step 146 to read the present brake pedal input, for example in the manner described at step 110 of the preceding embodiment. Next, the routine moves to step 148 to compare the brake pedal input to MINBRAK, a calibration constant which may be set as described in the preceding embodiment. If the brake pedal input exceeds MINBRAK at step 148, the routine moves to step 150, to deactivate the limit. Such deactivation removes the restriction on throttle authority as imposed at step 82 of the routine of FIG. 3 in accord with this invention, and precludes subsequent execution of the routine of FIG. 5 until power is removed from and later re-applied to the vehicle.

Next, or if the brake pedal input does not exceed MINBRAK at step 148, or if the accelerator pedal input is not less than MINACC at step 144, the routine moves to step 152, to return to the calling step 76 of the routine of FIG. 3.

The foregoing description of a preferred embodiment for the purpose of explaining this invention is not intended to limit or restrict the invention since many modifications may be made through the exercise of skill in the art without departing from the scope of the invention.

The embodiments of the invention in which a property or privilege is claimed are described as follows:

1. A method for controlling an internal combustion engine air inlet valve position, comprising:
   sensing release of an accelerator pedal;
   sensing depression of a brake pedal; and
   controlling the position of the air inlet valve according to a predetermined relationship between accelerator pedal position and air inlet valve position after sensing release of the accelerator pedal and depression of the brake pedal.

2. The method of claim 1, further comprising the step of limiting the position of the air inlet valve to a predetermined limit value before sensing release of the accelerator pedal and depression of the brake pedal.

3. A method of controlling a degree of opening of an internal combustion engine air inlet in response to a throttle opening command, comprising:
   sensing the throttle opening command;
   determining when the sensed throttle opening command is less than a predetermined minimum throttle command;
   sensing a braking command;
   determining when the sensed braking command exceeds a predetermined minimum braking command when the sensed throttle opening command is determined to be less than the predetermined minimum throttle command; and
   controlling the degree of opening of the internal combustion engine air inlet according to a predetermined relationship between the throttle opening command and the degree of opening of the air inlet after determining that the sensed braking command exceeds the predetermined minimum braking command.

4. The method of claim 3, further comprising the step of limiting the degree of opening of the internal combustion engine air inlet to a predetermined opening limit before determining that the sensed braking command exceeds the predetermined minimum braking command.

5. An apparatus for metering air through an air inlet valve into an internal combustion engine in response to a valve position command, comprising:
   sensing means for sensing the valve position command;
   means for sensing when the valve position command is less than a predetermined minimum valve command;
   brake command sensing means for sensing a braking command;
   determining means for determining when the sensed braking command exceeds a predetermined minimum braking command when the sensed valve position command is less than the predetermined minimum valve command;
   means for metering air through the air inlet valve according to a predetermined relationship between air inlet valve position and the valve position command after the sensed braking command is determined to exceed the predetermined minimum braking command.

6. The apparatus of claim 5, further comprising means for limiting the air metered through the air inlet valve to a predetermined minimum limit before the sensed braking command is determined to exceed the predetermined minimum braking command.

* * * * *